United States Patent Office 3,037,105
Patented May 29, 1962

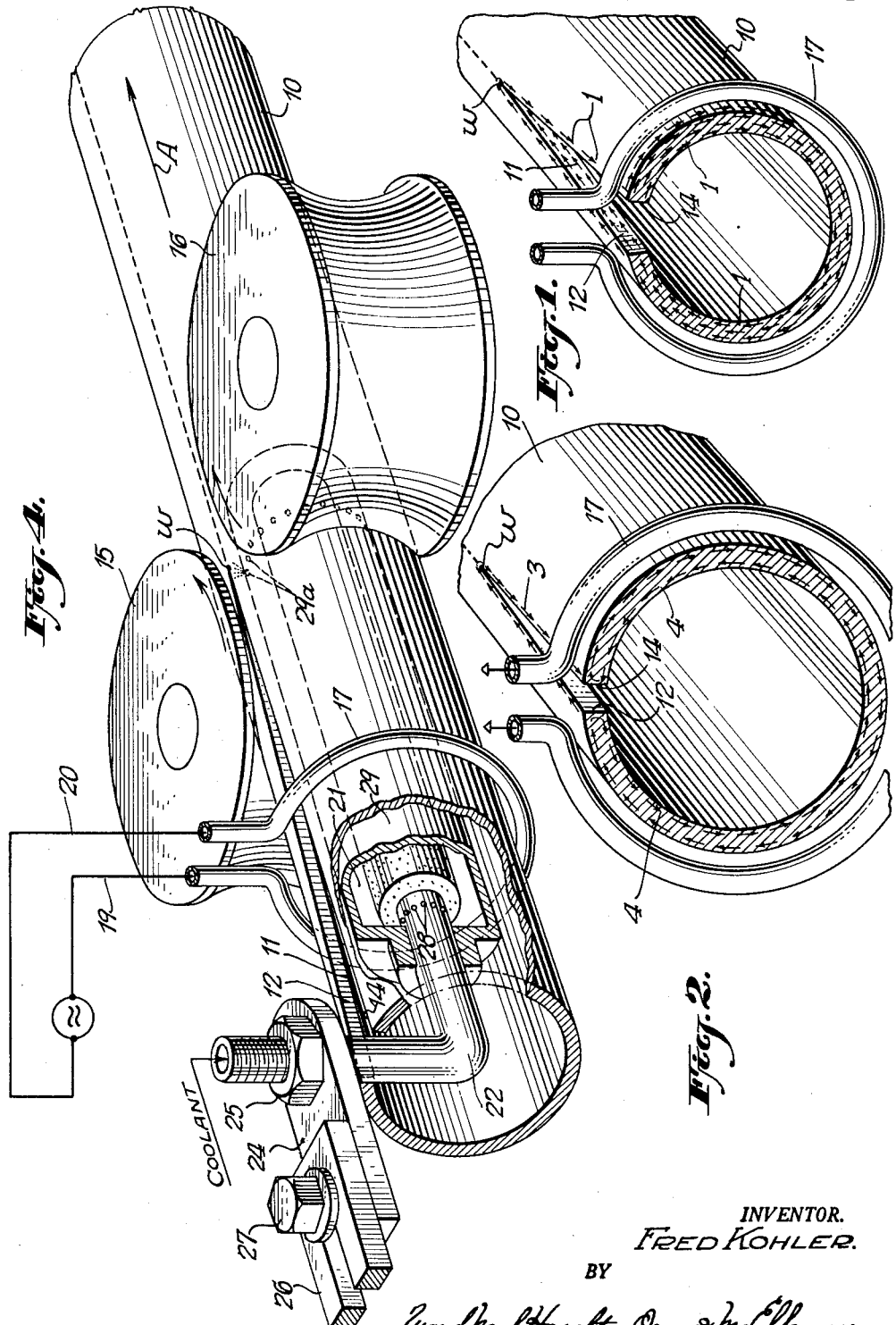

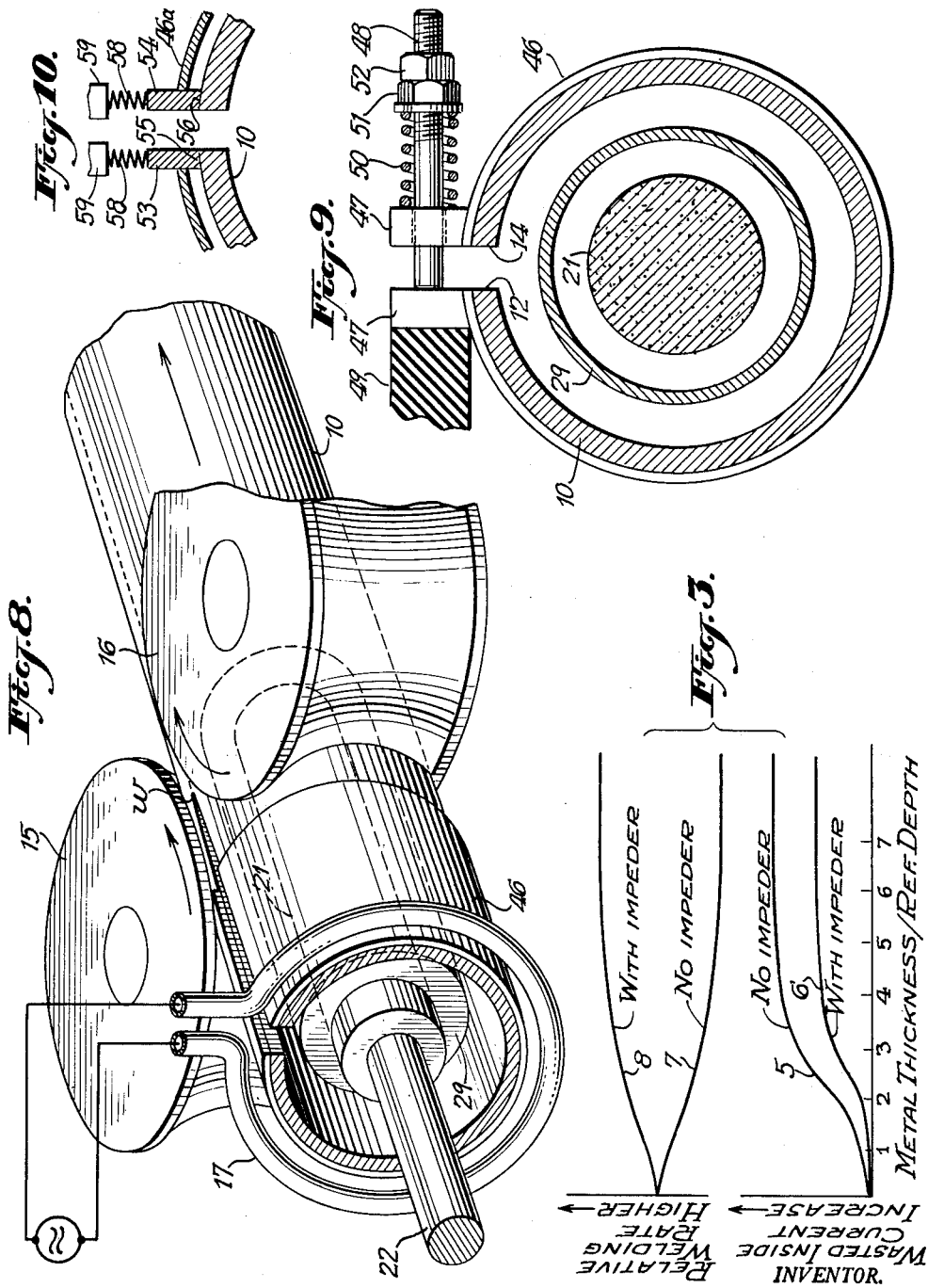

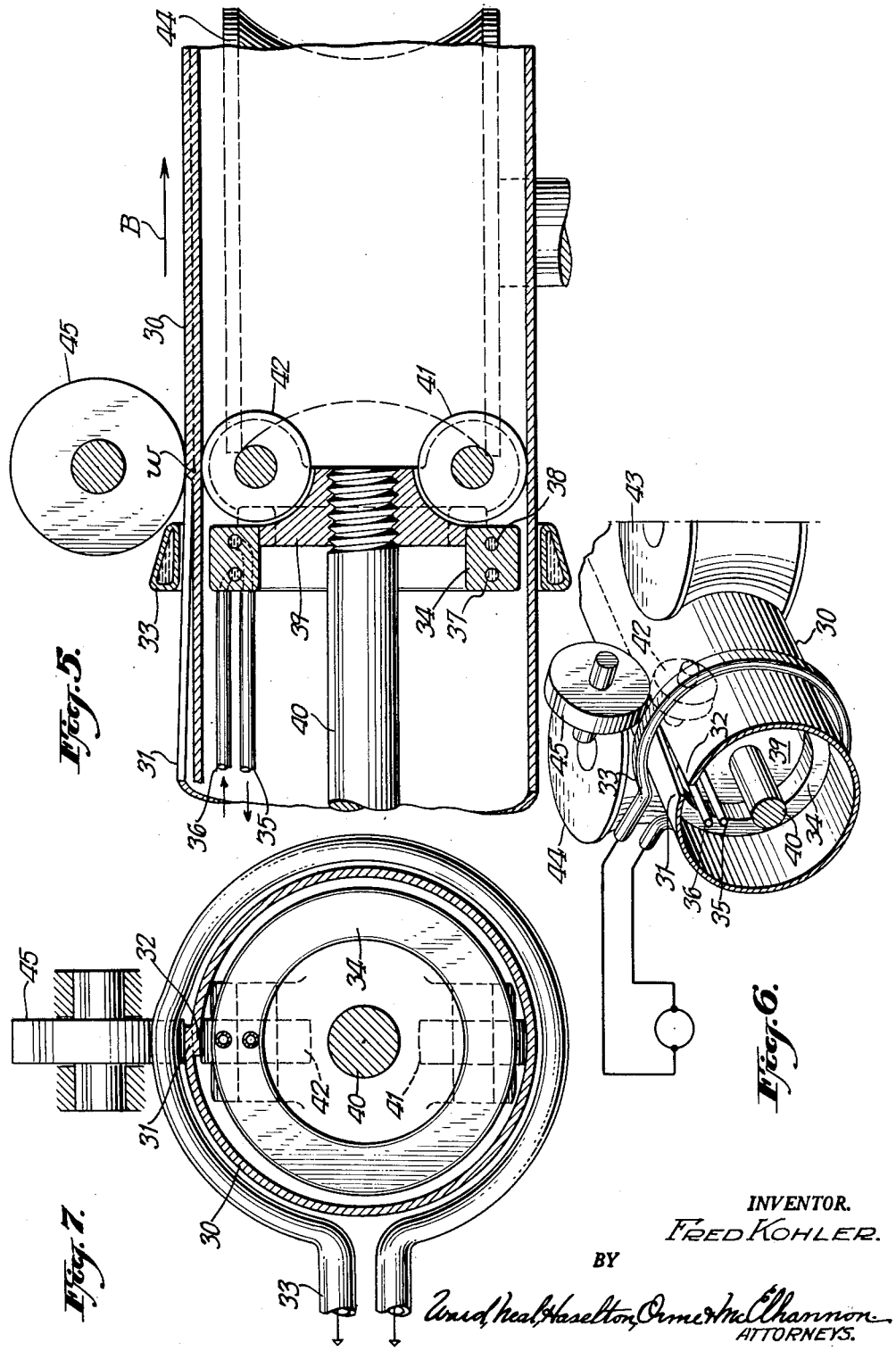

3,037,105
METHODS AND APPARATUS FOR THE INDUCTION WELDING OF TUBING
Fred Kohler, New York, N.Y., assignor, by mesne assignments, to American Machine & Foundry Company, New York, N.Y., a corporation of New Jersey
Filed Sept. 25, 1961, Ser. No. 140,348
9 Claims. (Cl. 219—8.5)

This invention relates to methods and apparatus for the welding of metal elements by high frequency, alternating electric currents induced into such elements, known as induction welding, and more particularly to methods and apparatus for continuously producing a longitudinal seam weld in metal tubing by induction welding.

It is known in the art that welded metal tubing may be produced by forming sheet metal into a C-shaped tube and bringing the edges into contact under pressure while inducing high frequency currents in the tube by a coil energized with such currents and surrounding the tube in advance of the weld point. It is, of course, necessary to heat only the edges to be welded to the welding temperature, but it is inherent with this method of welding that the heating current which flows along the opposed edges also flows circumferentially of the tube. Since such current flowing circumferentially of the tube does not contribute significantly to heating of the edges but does heat other portions of the tube, e.g. the back thereof, substantial energy is wasted in undesired heating.

Various attempts have been made to reduce the undesired heating. Thus, various coil configurations have been tried, and magnetic cores of the type used with low frequency induction welding apparatus have been employed. However, while improved results have been obtained in some cases, the results have been inconsistent and although some concentration of the currents has resulted, which may account for the improved results obtained, there has been no substantial reduction of the major energy loss, namely around the back of the tube. In addition, other difficulties have arisen because of such changes, namely, difficulties with the placement of modified coils, power losses in cores, mounting of cores, increased tube impedance with attendant coupling and energy source problems, etc. As a result, the use of magnetic cores has not resulted in sufficient improvement in many cases to warrant their continued use, and such cores have not been used in many applications where substantial improvements could be obtained.

Magnetic cores have been successfully used with tube welding apparatus using contacts to supply electrical currents to the tubing, for example, as shown in United States Patent No. 2,818,488. However, the problems with such high frequency resistance welding method are entirely different from those encountered with induction welding because with the former method it is not inherently necessary for the current flowing along the edges to be welded to flow around the back of the tube.

I have discovered that the failure of those skilled in the art to successfully employ magnetic cores or impeders with induction welding apparatus for the welding of tubing is due to a failure to appreciate the electrical phenomena involved and the critical relationship between the frequency of the electrical currents employed and the material being welded required to obtain improved results in the form of good welds at practical welding speeds. Thus, I have discovered that when the thickness of the metal used to form the tubing is at least three times the reference depth of the welding current in the metal, the use of a magnetic core or impeder will, in many cases, at least double the speed at which tubing can be welded with a given amount of power and in addition less objectionable heating patterns or discoloration may also be obtained.

As a further result of my discovery, I have found that shoes or bridges of lower resistance metal than the metal of the tubing may be positioned in contact with the tubing and so that the undesired losses around the back of the tube may be reduced both with and without the use of an impeder.

One object of the invention is to provide improved methods and apparatus for the induction welding of metal tubing.

Another object of the invention is to provide improved methods and apparatus for obtaining high speed welding of metal tubing at greater efficiency and with improved results using an induction coil for supplying welding currents to the tubing.

Other objects of the invention will be apparent from the following detailed description of the preferred embodiments thereof which description should be considered in conjunction with the accompanying drawing in which:

FIGS. 1 and 2 are perspective views illustrating certain technical considerations relative to the invention as hereinafter explained;

FIG. 3 comprises graphs hereinafter discussed relative to such technical considerations;

FIG. 4 is a somewhat schematic and perspective view illustrating one embodiment of the apparatus for carrying out the invention;

FIGS. 5, 6 and 7 comprise respectively a longitudinal sectional view, a perspective view and a transverse sectional view of a preferred form of apparatus for utilizing the invention for welding tubing having a lapped seam;

FIGS. 8 and 9 respectively comprise a perspective view and a transverse sectional view of a further embodiment of the apparatus of the invention; and FIG. 10 is a transverse sectional view partly broken away showing certain details.

It is conventional to define the depth of penetration of current in a conductor or reference depth as follows:

$$(1) \qquad d = 3160\sqrt{\frac{p}{uf}}$$

where $d$ is the reference depth in inches
$p$ is the resistivity of the metal in ohm-inches
$u$ is the relative permeability of the conductor and
$f$ is the frequency of the current in cycles per second.

Using the foregoing Formula 1, the reference depth for several metals at different frequencies is as follows:

*Table 1*

REFERENCE DEPTH IN 0.001 INCH

| Material | Frequency, Kilocycles/sec. | | | | |
|---|---|---|---|---|---|
| | 25 | 100 | 400 | 800 | 1,600 |
| Copper | 16.9 | 8.4 | 4.2 | 3.0 | 2.1 |
| Aluminum | 21.6 | 10.7 | 5.4 | 3.8 | 2.7 |
| Stainless Steel | 119 | 59 | 30 | 21 | 15 |
| Brass | 33.4 | 16.6 | 8.3 | 5.9 | 4.1 |
| Steel (Below Curie Point) | 1.2 | .59 | .30 | .21 | .15 |

The heating current induced in the tube is primarily affected by the frequency of the alternating current, the material of which the tube is formed, such material affecting its resistivity and inductive reactance, the wall thickness of the tube and the positioning of the induction coil around the tube. While the magnitude of the current and the path it follows is determined by the impedance of the various paths, heating is produced only as a result of the resistance which the current path offers to the current flow and is proportional to the magnitude of the resistance and the square of the current.

The heating effect produced at low frequencies is often quite different from that produced at high frequencies. When low frequency currents are employed to heat tubing for welding purposes, the reference depth is large and usually is at least equal to the thickness of the tube wall. In such case the current distribution is as shown by the arrows 1 in FIG. 1, the referenec numerals 10 and 17 in FIG. 1 designating, respectively, a metal tube and a single turn induction coil. Thus, the current flows throughout the thickness of the tube wall and along the edges 12 and 14 forming a V-gap 11. Such current flow occurs even at relatively high frequencies if the reference depth for the metal is large at such frequencies or if the tube wall is relatively thin. Under the conditions illustrated in FIG. 1, all of the current flowing along the edges 12 and 14 of the tube 10 and producing useful heating of the edges 12 and 14 also flows around the back of the tube 10 and produces wasted and undesired heating of the tube wall.

When a magnetic core or impeder is inserted in the bore of the tube 10 and within the coil 17 under the conditions shown in FIG. 1, the impeder increases the electrical impedance of the tube around the back thereof and thereby increases the induced voltage (sometimes detrimental) required to produce the desired welding current along the edges 12 and 14. This is somewhat offset by the increased coupling between the coil 17 and the tube 10 as a result of the presence of the impeder, but in any event, the introduction of the impeder does not reduce the current around the back of the tube 10 for a given welding current along the edges 12 and 14 and hence does not reduce the wasted power or the power which the current source is required to supply to the coil 17.

When the frequency of the current supplied to the coil 17 is selected so that the reference depth in the metal of the tube 10 is less than the thickness of the metal forming the wall of the tube 10, there is a current flow around the back of the tube 10 due not only to the flow of welding current along the edges 12 and 14 but also to a circulating current which flows in one direction around the outside of the wall of the tube 10 and in the opposite direction around the inside of the wall of the tube 10. Thus, as illustrated in FIG. 2, the outside wall current 2, around the back of the tube 10, comprises the current 3 along the edges 12 and 14 and the current 4 along the inside of the wall of the tube 10. Accordingly, even though there is a greater concentration of the welding current, and hence higher edge temperature for a given amount of current, at the edges 12 and 14, because of the use of a high frequency current, there is a larger amount of wasted heat around the tube due to the circulating current represented by the arrows 4 which constitutes, on the outside of the tube 10, part of the current 2.

The increase of the current 4 inside the wall of the tube 10 with an increase in the ratio of the wall metal thickness the reference depth and without a magnetic core or impeder is illustrated by curve 5 in FIG. 3. Thus, when the ratio is unity or less, the frequency of the heating current has little effect on the inside current, whereas as the ratio is increased above unity, the inside current increases, substantially to a ratio of about 3.5 and more slowly for higher ratios.

It will be apparent from a comparison of FIGS. 1 and 2 that the current flow with current frequencies such that the reference depth is less than the thickness of the tube wall is substantially different from the current flow with current frequencies which provide a reference depth approaching or greater than the tube wall thickness, and under the former conditions, illustrated in FIG. 2, there are two separate currents, an inside current 4 and an outside current 2, around the back of the tube 10. Therefore, it becomes possible to employ an impeder under the conditions of FIG. 2 for a different purpose and with an effect which is different from the effect under the conditions of FIG. 1.

One embodiment of apparatus of the invention for performing the method of the invention illustrated in FIG. 4 comprises a tube 10 having a longitudinal gap 11 therein, the edges 12 and 14 of the tube forming the gap converging relatively to one another and finally merging at a weld point W. A pair of squeeze rolls 15 and 16 are provided with contoured surfaces for engaging the exterior of the tube in the region of the weld point so as to positively bring the opposed surfaces 12 and 14 together, in a well known manner. A single-turn induction coil 17 is disposed somewhat in advance of the weld point and substantially surrounds the tube 10 while being slightly spaced from the outer surface thereof. It will be understood of course, that while a single-turn induction coil 17 is shown, a conventional multi-turn coil may be utilized if desired. The coil terminals are connected through leads 19 and 20 to a source of high frequency oscillating current (not shown) thus to set up an alternating magnetic field within the turn of the coil 17 and through which the tube is advanced, as indicated by the arrow A (FIG. 4). Preferably, the frequency of the current is at least 100 kilocycles per second to provide the advantages in welding obtained by the use of such frequencies and known to those skilled in the art.

The magnetic core or impeder 21 is supported within the tube 10 and the coil 17 and beneath the weld point W by a hollow arm 22 which is connected to a movable bracket 24 by means of a nut 25. The movable bracket 24 is, in turn, connected to a stationary bracket 26 by bolt 27. Thus, it will be seen that the impeder 21 may be adjusted longitudinally relatively to the weld point W. The impeder 21 is surrounded by a shroud 29 of insulating material, and a fluid coolant may be admitted into the arm 22 and into the bore of the shroud 29 through the holes 28 the coolant flowing about and cooling the core 21. The coolant may be returned in any suitable manner or may be discharged within the tube 10 through the holes 29a in the shroud 29 if desired. The impeder 21 preferably is formed of sintered magnetic oxide insulation material, preferably of types now well known, which have a low loss factor and high volume resistivity, for example, such as the material marketed under the name "Ferramic" by General Ceramic and Steatite Corp., the permeability thereof being substantially greater than unity. The use of the type of material is necessary when a current frequency greater than 100 kilocycles is employed in order to minimize losses in the impeder and for other reasons. Although the impeder 21 may be substantially shorter, and may have a length only slightly greater than the cross-sectional diameter of the coil 17, for the purposes of the invention, a long core, such as that shown in FIG. 4, is preferred for the purpose of assisting in concentrating the heating currents at the edges 12 and 14 and minimizing currents around the back of the tube 10 at portions thereof spaced in the direction of movement of the tube 10 from the coil 17.

The impeder 21 not only accomplishes the purposes for which an impeder has been used in the prior art but also, if the frequency of the heating current is chosen so as to provide a ratio of the thickness of the metal of the tube 10 to the reference depth of the current in the metal of at least three, reduces the current around the inside of tube 10 as well as the current around the outside of the tube 10 and beneath the coil 17 thereby reducing the power required to weld the tube 10 at a given rate. In addition, the appearance of the welded tube is improved in that the weld seam is narrow and uniform and there is less discoloration due to wasted heating in parts of the tube 10 other than at the tube edges 12 and 14. Similarly, as compared with the same amount of power required for welding without an impeder 21, or with an impeder 21 but with an improper selection of the frequency of the heating current, the apparatus shown in FIG. 4 provides much higher welding speeds, and the welding speed may, for example, be at least twice as high.

The effect of the impeder 21 with changes in the ratio of metal thickness to reference depth, and hence with changes in heating current frequency for a given thickness of a metal is illustrated by the curves shown in FIG. 3. Thus, curve 6 shows that as the ratio is increased above unity the inside current (current 4, FIG. 2) increases slowly and reaches substantially a limiting value at a ratio of about 3.5 whereas curve 5 shows that it increases rapidly and reaches a higher limiting value without the impeder 21. Similarly, for a fixed power input to the coil 17, curves 7 and 8 show that the relative welding speeds with and without an impeder increases as the ratio increases, reaching a maximum at a ratio of about three-to-one. Preferably, a ratio of metal thickness to reference depth of at least three is employed in applying the invention, but substantially improved results are obtained even if the ratio is as low as 2.5.

The following table indicates the results which have been obtained with the methods of my invention and employing apparatus of the type illustrated in FIG. 4 and a power source having a frequency of about 450 kilocycles per second:

*Table II*

| Material | Tubing Dia., In. | Wall Thickness, In. | Ratio of Wall Thickness To Reference Depth | Oscillator Current, Amps. | Tube Speed, f.p.m. | Impeder | Results |
|---|---|---|---|---|---|---|---|
| Steel | 1.0 | .05 | 167 | 6.6 | 133 | Yes | Good weld, narrow weld bead and little inside bead. |
| Do | 1.0 | .05 | 167 | 6.4 | 133 | No | No weld and broad heat pattern. |
| Do | 1.0 | .05 | 167 | 6.4 | 66 | No | Weld but wide heat pattern and poor bead. |
| Aluminum | 1.0 | .035 | 7 | 4.2 | 162 | Yes | Heavy weld. |
| Do | 1.0 | .035 | 7 | 4.2 | 214 | Yes | Medium weld. |
| Do | 1.0 | .035 | 7 | 4.2 | 162 | No | No weld. |
| Do | 1.0 | .065 | 13 | 4.2 | 112 | Yes | Medium weld. |
| Copper | .75 | .035 | 8.7 | 4.1 | 66 | Yes | Good weld. |
| Do | .75 | .035 | 8.7 | 4.2 | 66 | No | No weld; no heat pattern. |

It will be seen from an examination of Table II that with steel tubing and the use of an impeder, a welding speed almost twice as large as the welding speed without an impeder can be obtained and in addition, the weld bead is narrow and there is less discoloration due to heating parts of the tubing other than at the weld. Similarly, it will be observed that with aluminum and copper tubing welds can be obtained at speeds as high as 214 feet per per minute and 66 feet per minute respectively with an impeder whereas without the impeder no weld is obtained with aluminum tubing at 162 feet per minute and no weld is obtained with copper tubing at 66 feet per minute.

The methods of the invention are equally applicable to the production of welded tubing having a lapped seam weld and a preferred form of the apparatus for utilizing the invention is illustrated in FIGS. 5–7. The metal tube 30 illustrated in these figures is moved in the direction of the arrow B (FIGS. 5 and 6) and the overlapping edge portions 31 and 32 thereof are heated by means of the currents induced therein by an induction coil 33 surrounding the tube in advance of the weld point W, which coil 33 may have a single-turn as shown or may comprise several turns as in the prior art. The induction coil 33 is supplied by high frequency currents from a source (not shown), the frequency of the currents being chosen so as to provide a ratio of the thickness of the metal of the tube 30 to the reference depth of the current in such metal of at least 3.

An annular magnetic core or impeder 34 is mounted within the bore of the tube and is supplied with fluid cooling through the tubes 35 and 36 which connect with annular passageways 37 and 38 in the impeder 34. The impeder 34 is mounted on a plate 39 guided by a rod 40 and supported by a pair of rollers 41 and 42 rotatably connected to the plate 39 as shown. The rollers 41 and 42 may be made of metal or they may be made of a nonconducting ceramic.

The metal of the tubing is shaped by squeeze rolls 43 and 44 and the overlapping edge portions 31 and 32 are forged or mashed together at the weld point W by a roller 45 which may also be made of metal or ceramic.

To improve the efficiency of operation and to restrict the flow of the heating current to portions immediately in advance of the weld point W, it is desirable in many cases to place the induction coil 33 as close to the weld point W as possible. With the arrangement illustrated in FIG. 4 the squeeze rolls 15 and 16, which must be relatively large prevent the placement of the induction coil 17 close to the weld point W. However, with the embodiment illustrated in FIGS. 5–7 the squeeze rolls 43 and 44 may be placed downstream of the weld point W, as illustrated in FIGS. 5 and 6, because the heated edge portions 31 and 32 are forced together by the rollers 42 and 45 which may be relatively small in diameter. Accordingly, because of the smaller diameters of the rollers 42 and 45 the induction coil 43 may be placed relatively close to the weld point W even though the cross-sectional shape of the induction coil 33 is different from that shown, for example, of the shape shown in FIG. 4. However, by modifying the cross-section of the induction coil 33 so that it is tapered or triangular in cross-section as illustrated in FIG. 5, the induction coil 33 may be placed even closer to the weld point W and so that the narrower end of the triangular cross-section is spaced from the weld point W a distance less than the radius of the external roller 45. Preferably, the induction coil 33 is hollow as shown so as to permit fluid cooling thereof in a conventional manner.

As pointed out above the current flowing along the edge portions of the tube in advance of the weld point, which is substantially the only current effective to raise the edges to welding temperature, must also flow around the back of the tube on the surface thereof under the induction coil. Thus, in the embodiments described above, there still is a substantial flow of current around the outside and back of the tube 10 or 30 even though the inside current has been reduced by virtue of the impeder 21 or 34. Such current produces heating of the tube under the induction coil 17 or 33 and not only is wasted heating but also is heating which produces heat patterns in or discoloration of the tubing. This is an important problem in the manufacture of steel tubing because the edges of the tubing to be welded are raised to a temperature above the Curie point of the steel in order to accomplish welding of the edges. When the temperature of steel is raised above the Curie point its resistance reduces so that the $I^2R$ losses are less in the so heated steel than they are in the steel beneath the induction coil. Therefore, the heating per unit length in the steel which has a temperature above the Curie point is less than the heating produced in the steel forming the remainder of the current path, and the ratio of undesired heating to desired heating becomes larger. In accordance with a further embodiment of the invention illustrated in FIGS. 8 and 9, the metal of the tubing to be welded is surrounded, in advanve of the weld point and under the induction coil, by a split cylindrical or ring-shaped shoe having a higher conductivity, or lower resistivity, than the metal which is being formed into the welded tube.

As illustrated in FIGS. 8 and 9 the tube 10 may be surrounded by a stationary cylindrical shoe 46 made of a metal having a higher conductivity than the metal of the tube 10 such as, for example, copper if the tubing 10 is made of steel. The shoe 46 lies underneath the induction coil 17 and terminates in advance of the weld point W. The radial dimension of the shoe 46 is such that it is substantially greater than, preferably at least three times greater than, the reference depth of the current induced therein by the coil 33, such current flowing on the outer peripheral surface of the shoe 46. The shoe 46 may be cooled by flowing a cooling fluid thereon or by providing conventional fluid cooling channels therein to which cooling fluid is supplied. The shoe 46 engages the outer peripheral surface of the tube 10 and substantially all of the current which flows along the edge portions 31 and 32 and which would normally flow in the outside peripheral surface portion of the tubing metal flows along the outer surface of the shoe 46. Furthermore, due to the radial dimension or thickness of the shoe 46 described above and the frequency of the currents employed, substantially no current is induced in the portion of tube 30 underlying the coil 33 which causes the effect of the shoe 46 to be substantially different from the effect of such a shoe in applications employing relatively low frequencies where the reference depth in the metal of the type employed for the shoe 46 is substantially greater than the radial dimension or thickness of the shoe 46. Since the shoe 46 has a higher conductivity than the metal of the tube 10, the $I^2R$ losses therein will be less than the $I^2R$ losses caused by the current flowing in the outside surface of the tube metal and in addition, there will be little heating and substantially no discoloration of the outside surface of the tube 10 around the back thereof.

As illustrated in FIG. 9 the shoe 46 may have a pair of ears 47 thereon which ears 47 have openings therethrough for receiving a stud 48 extending from a bracket 49. The ears 47 are urged toward each other by a spring 50 the tension of which is adjustable by a nut 51 on the stud 48. The nut 51 may be locked in position by a lock nut 52. Preferably, the bracket 49 is made of insulating material and the stud 48 is either made of insulating material or is insulated from one or both of the ears 47 so as to prevent the flow of current between the ears 47 through the stud 48.

Since it is not necessary that the shoe 46 be in contact with the entire outside peripheral surface of the tube 10, the shoe 46 may be formed as illustrated in FIG. 10. In FIG. 10 to the shoe 46a is secured to a pair of brushes or contacts 53 and 54 which are pressed against the edge portions 55 and 56 of the tube 10 by means of any conventional device such as the springs 58 supported from the stationary brackets 59. The interior surface of the shoe 46a may be in closely spaced relation with the exterior surface of the tube 10. Thus, the shoe 46a contacts the tubing metal only at the edge portions 55 and 56 and the current which would normally flow around the back of the tube 10 flows through the contacts 53 and 54 and along the exterior surface of the shoe 46a. If desired, the contacts 53 and 54 may be made of the same material as the shoe 46a or may be made of a conductive material having better wearing properties than the metal of the shoes 46a.

It will be apparent from the foregoing that the shoe 46 or 46a, when used in combination with the impeder 21 or 34, further reduces the wasted heat losses as compared with the use of the impeder 21 or 34 alone and the shoe 46 or 46a is particularly useful under conditions where the current inside of the tube has been reduced by the use of the impeder and therefore, the ratio of tube metal thickness to reference depth is at least three. However, it will also be apparent that the shoe 46 will produce improved results in the absence of an impeder because of the reduction of the heat losses around the back of the tube and the reduction of discoloration of the tubing caused by the flow of current around the back of the tube. Furthermore, such a shoe 46 or 46a will also assist in reducing losses and discoloration if neither the impeder nor such a ratio is employed as long as the ratio of the thickness of the shoe 46 or 46a to the reference depth of the welding current therein is greater than unity and the conductivity of the metal of the shoe 46 or 46a is greater than the conductivity of the metal of the tube.

Having thus described my invention with particular reference to the preferred form thereof and having shown and described certain modifications, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. Method for welding together the edge portions of a longitudinal gap in metal tubing which comprises: advancing said tubing longitudinally thereof; pressing said edge portions together at a weld point while maintaining said portions in separated relation in advance of said weld point; inducing in the tubing in advance of the weld point flows of electrical current having a frequency of at least 100 kilocycles per second and such that ratio of the thickness of the tubing wall to the reference depth of such currents in the wall is at least three, such currents flowing along said edge portions and thereby progressively heating said portions to welding temperature at said weld point; and reducing the flow of current around the interior surface of said tubing by maintaining within said tubing and under the portion thereof in which said currents are induced, a body of substantially non-conducting magnetic material having a low loss factor, high volume resistivity and magnetic permeability substantially greater than unity, whereby the power losses interiorly and exteriorly of said tubing are reduced.

2. Apparatus for welding together the edge portions of a longitudinal gap in metal tubing, said edge portions being in contact at a weld point and being separated in advance thereof, comprising in combination: an induction coil surrounding said tubing shortly in advance of the weld point; a shoe made of a metal having a conductivity higher than that of the metal of the tubing mounted intermediate said coil and the tubing and terminating in advance of said weld point, said shoe encircling said tube but being discontinuous and terminating at and engaging the edge portions of the tubing; and means for supplying to said coil an electrical current of a frequency such that the ratio of the thickness of said shoe to the reference depth of said current in the metal of said shoe is at least three.

3. Apparatus for welding together the edge portions of a longitudinal gap in metal tubing, said edge portions being in contact at a weld point and being separated in advance thereof, comprising in combination: an induction coil surrounding said tubing shortly in advance of the weld point; a shoe made of a metal having a conductivity higher than that of the metal of the tubing mounted intermediate said coil and the tubing and terminating in advance of said weld point, said shoe encircling said tube but being discontinuous and terminating at and engaging the edge portions of the tubing; means for supplying to said coil an electrical current of a frequency such that the ratio of the thickness of said shoe to the reference depth of said current in the metal of said shoe is at least three; and magnetic core means mounted inside the tubing and said coil for increasing the reactance of the inside surface of the portion of the tubing underlying said induction coil.

4. Apparatus for welding together the edge portions of a longitudinal gap in metal tubing, said edge portions being in contact at a weld point and being separated in advance thereof, comprising in combination: an induction coil surrounding said tubing shortly in advance of the weld point; a shoe made of a metal having a conductivity higher than that of the metal of the tubing mounted intermediate said coil and the tubing and terminating in advance of said weld point, said shoe encircling said tube but being discontinuous and terminating at and engaging the edge portions of the tubing; means for supplying to said coil an electrical current of a frequency such that the ratio of the thickness of the metal of the tubing to the reference depth of said current in the metal of said tubing and the ratio of the thickness of said shoe to the reference depth of said current in the metal of said shoe are at least three; and magnetic core means mounted inside the tubing and said coil for increasing the reactance of the inside surface of the portion of the tubing underlying said induction coil.

5. Apparatus for welding together the edges of a longitudinal gap in metal tubing comprising in combination: means for longitudinally advancing the tubing while subjecting same to pressure to cause the edge portions at opposite sides of the gap to come together at a weld point; an induction coil surrounding said tubing shortly in advance of the weld point; a shoe made of a metal having a conductivity higher than that of the metal of the tubing mounted intermediate said coil and the tubing and terminating in advance of said weld point, said shoe encircling said tube but being discontinuous and terminating at and engaging the edge portions of the tubing; a source of electrical current of a frequency of the order of 100,000 cycles per second or higher and of a frequency such that the ratio of the thickness of the metal of the tubing to the reference depth of said current in the metal of said tubing and the ratio of the thickness of said shoe to the reference depth of said current in the metal of said shoe are at least three; means connecting said source to said induction coil for causing current to flow in said coil and to be induced in said shoe and to flow along said edge portions to and from the weld point; and magnetic core means of insulating material mounted inside the tubing and said coil for increasing the reactance of the inside surface of the portion of the tubing underlying said induction coil.

6. Apparatus for welding together the edges of a longitudinal gap in metal tubing comprising in combination: means for longitudinally advancing the tubing while subjecting same to pressure to cause the edge portions at opposite sides of the gap to come together at a weld point; an induction coil surrounding said tubing shortly in advance of the weld point; a shoe made of a metal having a conductivity higher than that of the metal of the tubing mounted intermediate said coil and the tubing and terminating in advance of said weld point, said shoe encircling said tube but being discontinuous and terminating at and engaging the edge portions of the tubing; a source of electrical current of a frequency of the order of 100,000 cycles per second or higher and of a frequency such that the ratio of the thickness of the metal of the tubing to the reference depth of said current in the metal of said tubing and the ratio of the thickness of said shoe to the reference depth of said current in the metal of said shoe are at least three; means connecting said source to said induction coil for causing current to flow in said coil and to be induced in said shoe and to flow along said edge portions to and from the weld point; and core means mounted inside the tubing and said coil for increasing the reactance of the inside surface of the portion of the tubing underlying said induction coil, said core means comprising a sintered magnetic oxide insulating material having a low loss factor and high volume resistivity and having a magnetic permeability substantially greater than unity.

7. Apparatus for welding together the edge portions of a longitudinal gap in metal tubing comprising in combination: means for longitudinally advancing the tubing with the edge portions in spaced overlapping relation; means to cause the edge portions at opposite sides of the gap to come together at a weld point; an induction coil surrounding said tubing shortly in advance of the weld point and adjacent said externally mounted roller, said coil having a turn with a tapered cross-section and mounted with the narrower portion of its cross-section nearer to said last-mentioned means; a source of electrical current of a frequency such that the ratio of the thickness of the metal of the tubing to the reference depth of said current in the metal of said tubing is at least 2.5; means connecting said source to said induction coil for causing current to flow in said coil and to be induced in said tubing and to flow along said edge portions to and from the weld point; and magnetic core means of insulating material mounted inside the tubing and said coil for increasing the reactance of the inside surface of the portion of the tubing underlying said induction coil.

8. Apparatus for welding together the edge portions of a longitudinal gap in metal tubing comprising in combination: means for longitudinally advancing the tubing with the edge portions in spaced overlapping relation; means to cause the edge portions at opposite sides of the gap to come together at a weld point comprising a roller mounted externally of the tubing and engaging one of said edge portions, a roller mounted internally of the tubing and engaging the other of said edge portions and means for urging said rollers toward each other; an induction coil surrounding said tubing shortly in advance of the weld point and adjacent said externally mounted roller, said coil having a turn with tapered cross-section and mounted with the narrower portion of its cross-section nearer to said externally mounted roller; a source of electrical current of a frequency of the order of 100,000 cycles per second or higher and of a frequency such that the ratio of the thickness of the metal of the tubing to the reference depth of said current in the metal of said tubing is at least three; means connecting said source to said induction coil for causing current to flow in said coil and to be induced in said tubing and to flow along said edge portions to and from the weld point; and magnetic core means of insulating material mounted inside the tubing and said coil for increasing the reactance of the inside surface of the portion of the tubing underlying said induction coil.

9. Apparatus for welding together the edge portions of a longitudinal gap in metal tubing comprising in combination: means for longitudinally advancing the tubing with the edge portions in spaced overlapping relation; means to cause the edge portions at opposite sides of the gap to come together at a weld point comprising a roller mounted externally of the tubing and engaging one of said edge portions, a roller mounted internally of the tubing and engaging the other of said edge portions, means for urging said rollers toward each other and rollers engaging the sides of the tubing at portions thereof after the weld point; an induction coil surrounding said tubing shortly in advance of the weld point and adjacent said externally mounted roller, said coil having a turn with a triangular cross-section and mounted with the narrower portion of its cross-section nearer to said externally mounted roller and less than the radius of said last-mentioned roller from said weld point; a source of electrical current of a frequency of the order of 100,000 cycles per second or higher and of a frequency such that the ratio of the thickness of the metal of the tubing to the reference depth of said current in the metal of said tubing is at least three; means connecting said source to said induction coil for causing current to flow in said coil and to be induced in said tubing and to flow along said edge portions to and from the weld point; and magnetic core means of insulating material mounted inside the tubing and said coil for increasing the reactance of the inside surface of the portion of the tubing underlying said induction coil.

References Cited in the file of this patent

UNITED STATES PATENTS

| | | |
|---|---|---|
| 1,365,198 | Sessions | Jan. 11, 1921 |
| 2,367,715 | Chapman | Jan. 23, 1945 |
| 2,833,910 | Stanton et al. | May 6, 1958 |
| 2,857,503 | Rudd et al. | Oct. 21, 1958 |
| 2,886,691 | Rudd | May 12, 1959 |